(12) United States Patent
Shaffer (10) Patent No.: US 7,427,575 B2
(45) Date of Patent: Sep. 23, 2008

(54) FACED FIBROUS INSULATION

(75) Inventor: Roy E. Shaffer, Granville, OH (US)

(73) Assignee: Owens Corning Intellectual Capital, LLC DE (US)

( * ) Notice: Subject to any disclaimer, the term of this patent is extended or adjusted under 35 U.S.C. 154(b) by 86 days.

(21) Appl. No.: 10/858,666

(22) Filed: Jun. 2, 2004

(65) Prior Publication Data

US 2005/0272338 A1    Dec. 8, 2005

(51) Int. Cl.
*D04H 3/00*    (2006.01)
*B32B 5/16*    (2006.01)

(52) U.S. Cl. .................. 442/415; 442/417; 428/457; 428/903

(58) Field of Classification Search .......... 442/71, 442/149, 150, 164, 170, 171, 415, 417; 428/457, 428/903
See application file for complete search history.

(56) References Cited

U.S. PATENT DOCUMENTS

| | | | |
|---|---|---|---|
| 3,394,737 A | 7/1968 | Hoffmann | |
| 3,768,523 A | 10/1973 | Schroeder | |
| 4,101,700 A | 7/1978 | Ray, Jr. et al. | |
| 4,226,662 A | 10/1980 | McCort | |
| 4,302,499 A | 11/1981 | Grisch | |
| 4,332,713 A * | 6/1982 | Lehmann | 156/328 |
| 4,496,583 A | 1/1985 | Yamamoto et al. | |
| 4,500,594 A | 2/1985 | Credali et al. | |
| 4,777,086 A * | 10/1988 | Madden et al. | 442/394 |
| 5,041,178 A | 8/1991 | Kielmeyer et al. | |
| 5,240,527 A | 8/1993 | Lostak et al. | |
| 5,685,938 A | 11/1997 | Knapp et al. | |
| 5,759,927 A | 6/1998 | Meeker | |
| 5,783,268 A | 7/1998 | Noonan et al. | |
| 5,848,509 A | 12/1998 | Knapp et al. | |
| 5,900,298 A | 5/1999 | Syme et al. | |
| 6,135,747 A | 10/2000 | Syme et al. | |
| 6,136,732 A * | 10/2000 | Patel | 442/149 |
| 6,270,865 B1 | 8/2001 | Noonan et al. | |
| 6,415,573 B1 | 7/2002 | Moulder | |
| 6,457,237 B1 | 10/2002 | Matthews et al. | |
| 6,555,489 B1 | 4/2003 | Pfeffer | |
| 2002/0146521 A1 | 10/2002 | Toas et al. | |
| 2002/0160682 A1* | 10/2002 | Zeng et al. | 442/411 |
| 2003/0008586 A1 | 1/2003 | Kajander et al. | |
| 2003/0041626 A1 | 3/2003 | Yang et al. | |
| 2003/0068943 A1 | 4/2003 | Fay | |

(Continued)

FOREIGN PATENT DOCUMENTS

JP    403084355    4/1991

(Continued)

*Primary Examiner*—Arti R. Singh
*Assistant Examiner*—Matthew D Matzek
(74) *Attorney, Agent, or Firm*—James J. Dottavio (57) ABSTRACT

A faced fibrous insulation having a mat facing on one or more surfaces of a fibrous insulation material is provided. The mat facing provides improved surface quality, high and controlled adhesion, and is easily manufactured. The mat facing of the present invention includes a pre-applied adhesive that is heat activated to provide adhesion to the fibrous insulation. The mat facing may be input into the glass fiber forming section of a fibrous insulation production line. Alternatively, the mat facing may be applied to the uncured pack prior to curing or applied to the cured fibrous insulation.

5 Claims, 6 Drawing Sheets

U.S. PATENT DOCUMENTS

| | | |
|---|---|---|
| 2003/0073368 A1 * | 4/2003 | Berkhoff et al. ............ 442/389 |
| 2003/0127171 A1 | 7/2003 | Pfeffer |
| 2003/0211262 A1 | 11/2003 | Ruid et al. |
| 2003/0236043 A1 | 12/2003 | Calzavara et al. |
| 2004/0020712 A1 | 2/2004 | Bargo, II |
| 2004/0023587 A1 | 2/2004 | Bargo, II |
| 2005/0153616 A1 * | 7/2005 | Suda et al. .................. 442/327 |

FOREIGN PATENT DOCUMENTS

| | | |
|---|---|---|
| WO | WO 00/57101 | 9/2000 |
| WO | WO 02/066877 | 8/2002 |
| WO | WO 02/069690 | 9/2002 |
| WO | WO 2004/005022 | 1/2004 |

* cited by examiner

FACED FIBROUS INSULATION

TECHNICAL FIELD AND INDUSTRIAL APPLICABILITY OF THE INVENTION

The present invention relates to faced fibrous insulation. The faced insulation of the present invention provides improved thermal and acoustical properties for use in heating ventilating and air conditioning (HVAC) equipment. The faced insulation of the present invention also provides improved surface qualities for use in finished board applications and improved facing adhesion qualities for use in high velocity air stream applications.

BACKGROUND OF THE INVENTION

Faced fibrous insulation is used in a variety of thermal and acoustical applications. Conventional insulation assemblies used in HVAC units typically include a facing layer adhered to a fibrous insulation layer. The facing layer is useful in preventing or at least limiting any air erosion damage which may be caused by the flow of air directly across the insulation layer.

One example of a conventional faced fibrous insulation product is disclosed in U.S. Pat. No. 6,444,289. U.S. Pat. No. 6,444,289 discloses the use of non-porous aluminum foil, foil reinforced paper, foil scrim paper, or polymeric material which is adhered to the fibrous insulation by an adhesive. Perforations are formed in the facing layer after the facing layer and the insulation layer are joined and the adhesive bond is set or cured.

U.S. Pat. Nos. 5,783,268 and 6,270,865 disclose that faced fibrous insulation used in duct board provides an air flow surface with increased air flow and less turbulence. The faced fibrous insulation also provides a smooth surface that reduces the accumulation of dirt and dust. In addition, U.S. Pat. Nos. 5,783,268 and 6,270,865 disclose the use of a central layer of compressed fiberglass one or one and one half inches thick with a polyester/glass mat facing having a density of about 0.01 pounds per square foot, a minimum tensile strength of 7 pounds/inch in the machine direction, and 5 pounds/inch in the cross-machine direction. The fibrous insulation is formed by the industry standard rotary fiber process, as developed by Owens Corning, in which molten glass is spun into fibers by a perforated spinner and blown by high temperature gas to elongate the individual fibers. The fibers are then sprayed with a phenol-formaldehyde binder to form an uncured pack of glass fibers. The mat facing is then applied to the pack of glass fibers so that the mat facing is adhered to the fiberglass solely by the uncured binder in the pack when the pack and facing are cured.

The '268 and '865 patents also disclose the formation of shiplap edges at the outer edges of the duct board to assist in the fabrication of a fiberglass duct. However, this method tends to result in poor adhesion of the mat facing to the fibrous insulation due to the inherent difficulty in controlling the amount of binder at the surface. The method also tends to increase manufacturing costs because the process of curing the fibrous insulation must be optimized to provide a suitable bond between the mat facing and the glass fibers rather than optimizing for improved efficiency in curing the binder in the pack of fibers.

In addition to the method disclosed in the '268 and '865 patents, it is known in the art to manufacture faced insulation by spraying a binder directly onto the facing prior to application of the facing to an uncured pack of fibers and subsequently curing the binder in the pack and on the facing. For example, U.S. Pat. No. 5,041,178 discloses spraying a binder onto the interface where the facing meets the upper and lower surfaces of the uncured pack. This method tends to saturate the fibers on the surface of the finished board which causes a brashy surface on the fibrous insulation due to the fiber ends which are fixed in place by the high amount of binder at the surface. The high amount of binder on the mat also may cause discoloration of the mat facing causing a spotty or mottled surface on the fibrous insulation.

Faced fibrous insulation may also be formed by applying a polymer directly to the surface of a cured fiberglass pack. U.S. Pat. No. 5,900,298 discloses the use of a row of spiral spray extrusion heads for directly extruding ethyl vinyl acetate (EVA) fibers onto the cured pack of fibers in an amount of 1.2 to 3.5 g/ft$^2$. U.S. Pat. No. 5,487,412 discloses a duct board including an applied layer of an acrylic foam coating having a dry solids content of 10-20 g/ft$^2$ of the surface of the board. The coating also includes an inorganic biocide such as silver nitrate.

SUMMARY OF THE INVENTION

The present invention provides a mat facing on one or more surfaces of a fibrous insulation material. The mat facing provides improved surface quality, high and controlled adhesion, and is easily manufactured. The mat facing of the present invention includes a pre-applied adhesive that is heat activated. The mat facing may be input into the glass fiber forming section of a fibrous insulation production line. Alternatively, the mat facing may be applied to an uncured pack prior to curing or applied to cured fibrous insulation. It is an object of the present invention to provide a mat facing on one or more surfaces of a fibrous insulation material to provide improved surface quality, high and controlled adhesion, and is easily processed

DETAILED DESCRIPTION AND PREFERRED EMBODIMENTS OF THE INVENTION

The mat facing of the present invention includes a pre-applied adhesive that is heat activated to provide adhesion to the fibrous insulation. The mat facing may be input into the glass fiber forming section of a fibrous insulation production line, or alternatively may be applied to the uncured pack prior to curing, or applied to the cured fibrous insulation or in yet another alternative may be applied in a post-curing oven or offline process. It is a further object of the present invention to provide a mat faced fibrous insulation that may be reliably manufactured through a wide variety of process parameters without adversely affecting the surface quality or the adhesion of the mat to the fibrous insulation.

The mat faced fibrous insulation product of the present invention includes at least one layer of fibrous insulation such as glass fibers, mineral wool, rock wool, or polymer fibers and at least one layer that is a fibrous mat. Mat faced insulation products according to the invention include products that have a single layer of fibrous insulation and a mat applied to one surface; a single layer of fibrous insulation and a mat applied to opposed major surfaces; a single layer of fibrous insulation and a mat applied to opposed major surfaces where at least one layer of the mat is wider than the major surfaces so that one or more minor surfaces of the fibrous insulation may be mat faced.

Figure 1:
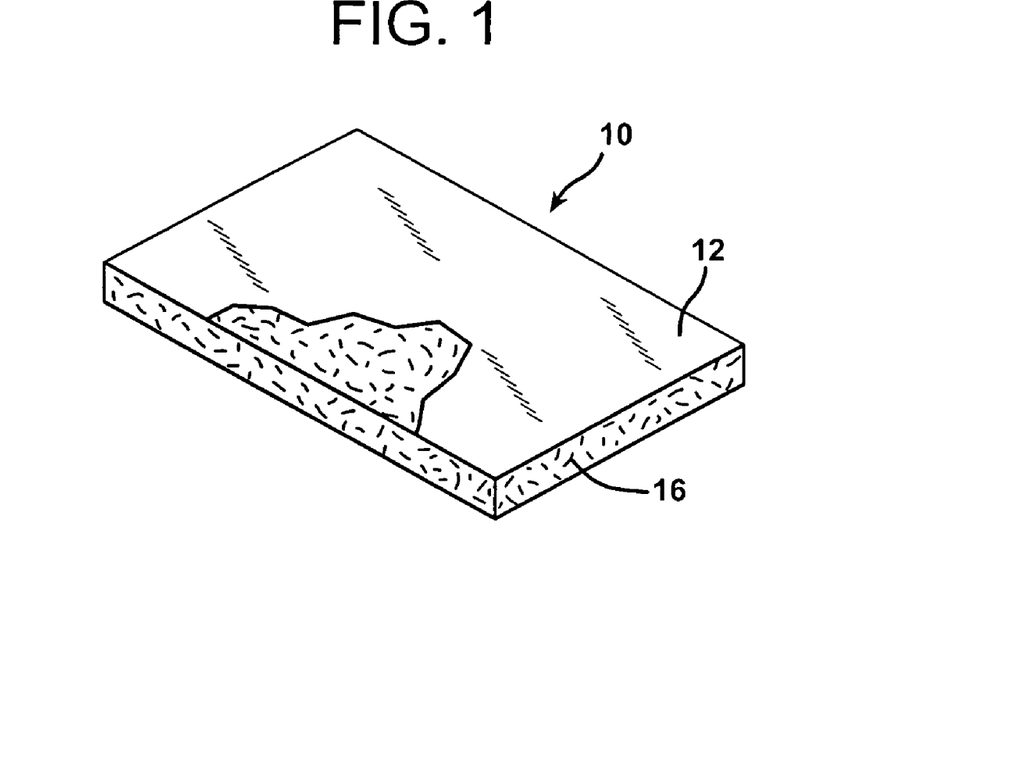
FIG. 1 is a perspective view, partially cut away, of a mat faced fibrous insulation of the present invention having a mat facing on a single side.

In the embodiment shown in FIG. 1, the mat faced fibrous insulation 10 includes a layer of fibrous insulation 16, typically glass fibers, but optionally mineral wool, rock wool, or polymer fibers, and at least one layer that includes a fibrous mat 12. The fibrous mat 12 may be formed of any suitable fibrous insulation, such as, but not limited to, glass fibers, mineral wool, rock wool, or polymer or natural fibers. The fibers may be of any suitable length and diameter, which would be easily determined by one of skill in the art. Fiber length is highly dependent on processing and may range from less than about 1 inch (about 2.5 cm) to more than about 7 in. (about 17.5 cm). Fiber diameter is typically measured in microns ($\mu$) (one hundred thousandths of an inch (HT)). The fibrous insulation 16 may have any suitable amount of binder. Binder content is expressed as a percent of the weight of the bound fibers after curing, in weight percent. The length and diameter of the fibers, as well as the amount of binder applied to the fibrous insulation 16, are dependent upon the final use of the product. For example, heating and ventilating thermomat (HVT) may have a fiber diameter of between about 20 to about 35$\mu$ and a binder content of between about 3 to about 15 wt. %. Duct board is generally a more rigid product and may have a fiber diameter of between about 12 to about 22$\mu$ and a binder content of between about 2 to about 10%. Light density insulation may have a fiber diameter of between about 20 to about 35$\mu$ and a binder content of between about 3 to about 15 wt. %. The uncured fibrous insulation used in these products is cured at a time and temperature sufficient to cure the binder. The cure time is determined by the amount of binder in the product, product thickness, and product density and is controlled by the length of the oven and the speed at which the production line is run but can range from less than about 1 minute to more than about 5 minutes. The temperature of the curing oven is controlled to evaporate water used in the binder, cure the binder, and control any chemical reaction which may produce undesirable reaction products.

Figure 2:
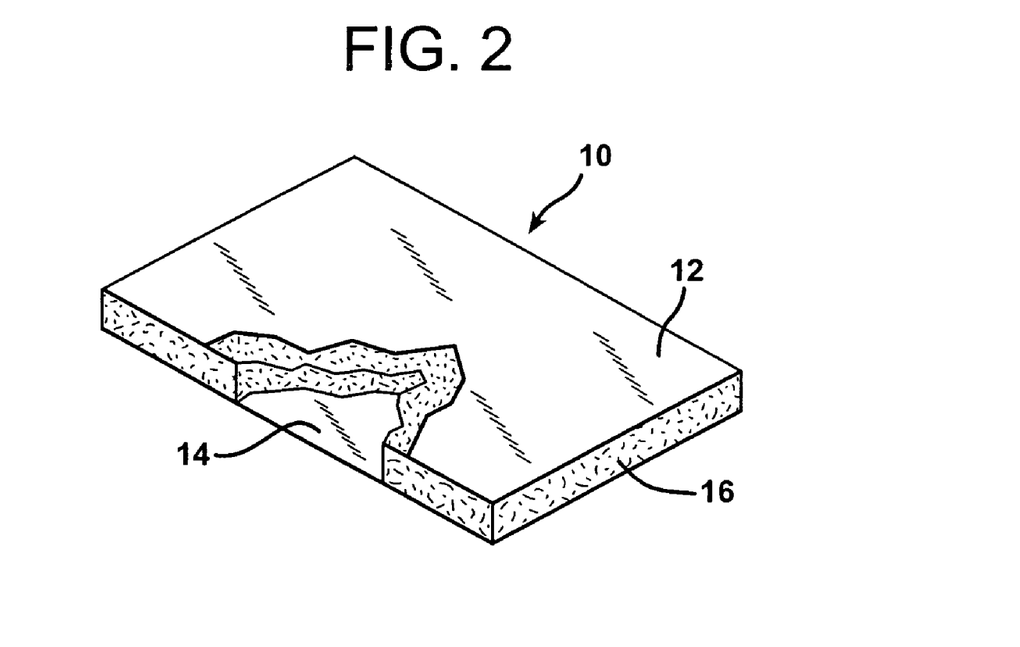
FIG. 2 is a perspective view, partially cut away, of a mat faced fibrous insulation of the present invention having a mat facing on opposing sides.

FIG. 2 shows an alternative embodiment in which the mat faced fibrous insulation 10 includes a mat facer 12 on one major surface and a mat facer 14 on a second major surface. In a related embodiment, it is possible to apply mat 12 to one surface of the fibrous insulation 16 where the mat 12 is wider than the fibrous insulation 16 and drapes over the edges to face one or more minor surface of the fibrous insulation 16.

Figure 3:
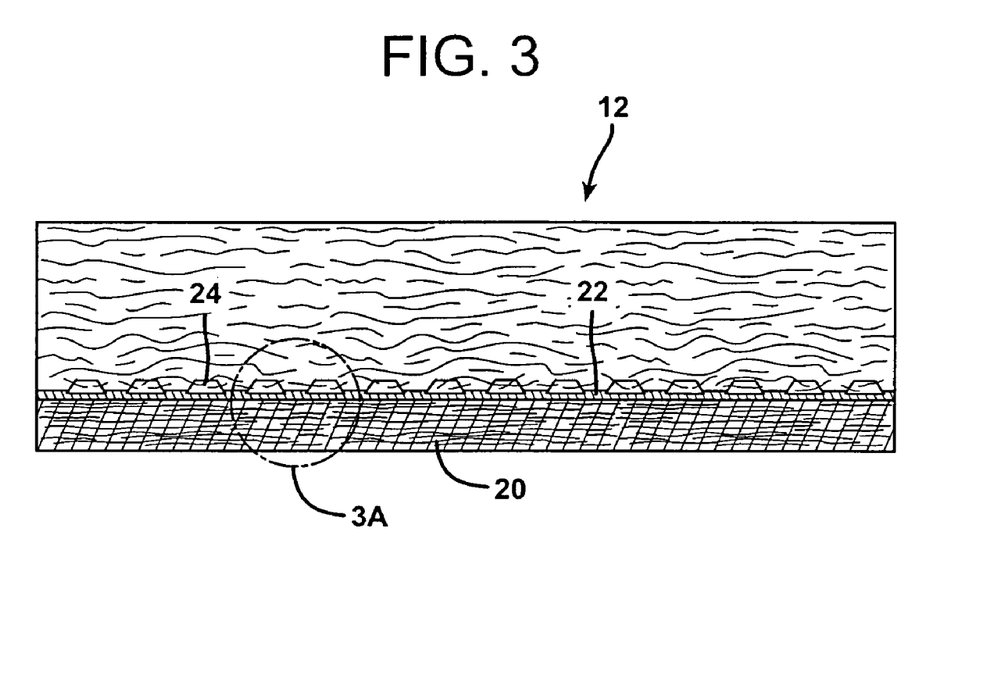
FIG. 3 is a cross-sectional view of a mat faced fibrous insulation detailing a mat according to the present invention having an adhesive applied thereto.

FIG. 3 shows a cross-sectional view of the mat faced fibrous insulation 10 detailing the mat 12 having an adhesive applied thereto. Mat 12 includes a polymer fiber non-woven web 20 which may be processed by known methods to include any suitable binder such as an acrylic, any suitable flame retardants such as halogens, antimony oxide or borates, and/or any suitable pigment such as carbon black or organic dies.

The non-woven web 20 may be formed of any suitable fibers such as polyethylene, polypropylene, polyesters, rayon, nylon, and blends of such fibers. The fibers may be staple fibers or continuous filaments. In addition, the fibers may be bicomponent to facilitate bonding. For example, a fiber having a sheath and core of different polymers such a polyethylene (PE) and polypropylene (PP) may be used or mixtures of PE and PP fibers may be used. The non-woven web 20 may optionally be treated with any suitable fungicide. Fungicides are well known in the non-woven field. One particularly suitable fungicide is diiodomethyl-p-tolysulfone, which is available from Angus Chemical Company of Buffalo Grove, N.Y., USA under the trade name AMICAL FLOWABLE. However, other suitable fungicides identified by one of skill in the art may be used. The non-woven web 20 may be treated with a fungicide either during manufacture or in a post manufacture process.

Figure 3A:
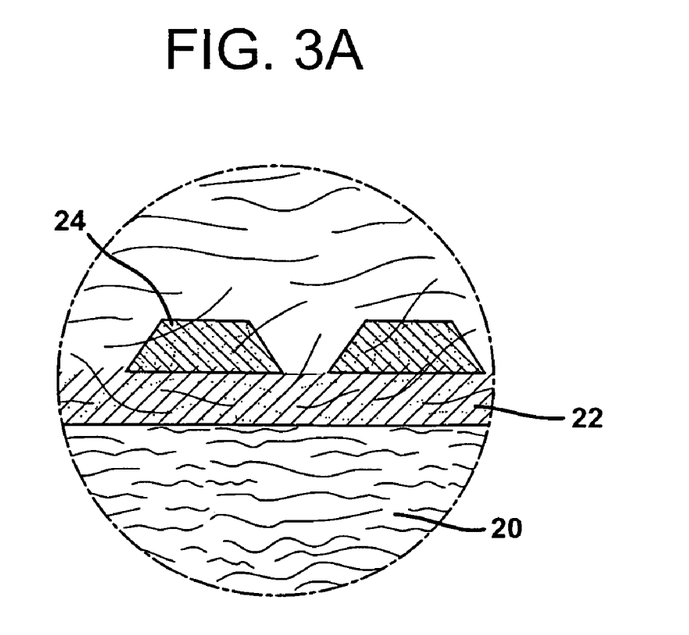
FIG. 3A is a detailed cross-sectional view from FIG. 3 showing the interaction of the glass fibers and the adhesive on the mat.

Preferably, both a low melting point adhesive 22 and a relatively higher temperature melting point adhesive 24 are distributed on a surface of the non-woven web 20 and heated to a temperature above the melting point of the low melting point adhesive 22 to adhere the high melting point adhesive 24 to the non-woven web 20. Suitable low melting point adhesives 22 include polyethylene, ethylene vinyl acetate and other polymer adhesives. Suitable high temperature adhesives 24 include polyamide adhesives, phenolic powders and other high activation temperature adhesives, relative to the low melting point adhesive 22.

Non-wovens having a blend of polyester and rayon fibers between about 30 and about 50 wt. % rayon and between about 50 and about 70 wt. % polyester were produced. The non-wovens included acrylic binder, and had had a base weight of about 4.5 to about 5.5 oz/ft$^2$ (about 1373.2 to about 1678.3 g/m$^2$) and an adhesive weight of about 0.57 to about 0.77 oz/ft$^2$ (about 174 to about 235 g/m$^2$). The non-woven included acrylic binder, halogen antimony oxide fire retardant, carbon black, organic dies and diiodomethyl-p-tolysulfone.

A mixture of polyamide and polyethylene powders was applied to one surface of the non-woven. The non-woven was then heated to a temperature above the melting point of the low melting point adhesive to adhere the high melting point adhesive 22 to the non-woven to form mat 12.

In order to test adhesion, a mat 12 having 50% rayon and 50% polyester and a base weight of 5.0 oz/ft$^2$ (1526 g/m$^2$) with 0.67 oz/ft$^2$ (204.5 g/m$^2$) was unrolled and placed on a 6.5 ft. (2.1 m.) belt laminator with a fibrous insulation layer 16 of fiberglass having a thickness of 1.0 in. (25.4 mm). The mat 12 was exposed to a temperature of 400° F. (204° C.) for a period of 10 s. and laminated at speeds up to 40 fpm with good adhesion. In another test adhesion, a mat 12 having 30% rayon and 70% polyester and a base weight of 5.0 oz/ft$^2$ (1526 g/m$^2$) with 0.67 oz/ft$^2$ (204.5 g/m$^2$) was unrolled and placed under an oil heated hot roll laminator with a fibrous insulation layer 16 of fiberglass having a thickness of 1.0 in. (25.4 mm). The oil heated hot roll laminator had a diameter of 12 in (305 m.) and a 50% wrap of the facing on the roll. The mat 12 was exposed to a temperature of 400° F. (204° C.) for a period of about 5 s. and laminated at speeds up to 30 fpm with good adhesion.

Test for fiber erosion were conducted according to the industry recognized Underwriters Laboratories standard UL-181 in which the mat faced fibrous insulation 10 was subjected to a 15,000 FPM (foot per minute) (76.2 m/s) air stream. The UL-181 provides that material for a duct section shall not break away, crack, peel, flake off or show evidence of delamination or continued erosion when the duct is subjected to air passed through a typical section at a velocity equal to two and one-half times the rated velocity. The fibrous insulation is tested at 15,000 feet per minute (4500 m per minute).

Figure 4:
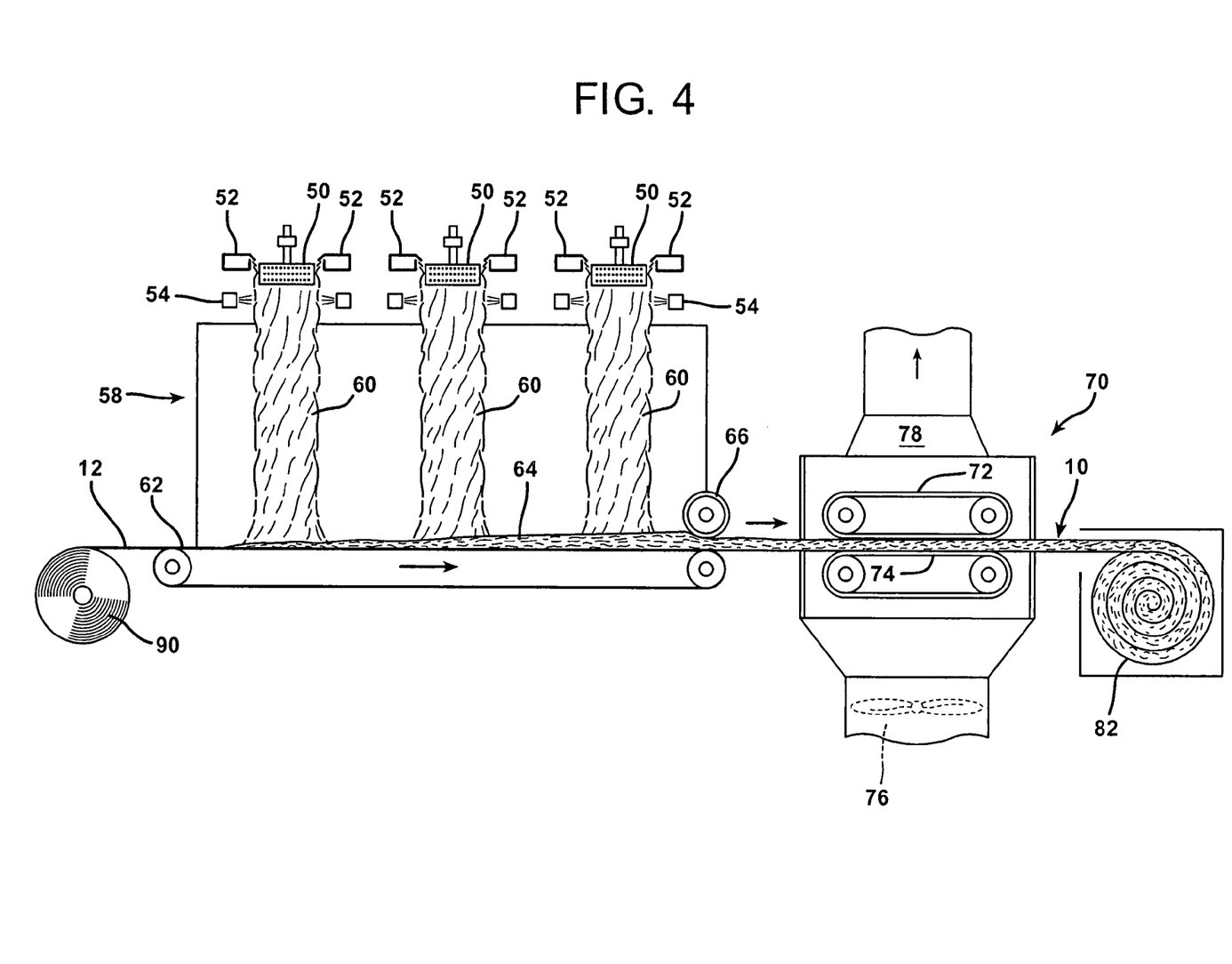
FIG. 4 is a plan view of a manufacturing line for producing mat faced fibrous insulation according to the present invention wherein the mat facing is input into the glass fiber forming section and the uncured pack is deposited on the mat facing and showing that the mat faced fibrous insulation is rolled after curing.

As shown in FIG. 4, a glass fiber manufacturing line including a fiber forming section 58, a curing oven 70 and a roll-up device 82. As shown in FIG. 4, the forming section 58 includes a number of fiberizing spinners 50 that are supplied with a molten glass stream (not shown). The fiberizing spinners 50 are rotated at high speeds and the molten glass is forced to pass through holes in the circumferential side wall of the spinners 50 to form fibers. Blowers 52 direct a gas stream in a substantially downward direction to impinge the fibers, turning them downward, attenuating the primary fibers to form a veil 60. Binder sprayers 54 spray binder onto the veil 60 that is deposited onto mat 12 which is placed collection chain 62 where they are collected into uncured pack 64.

The uncured pack 64 and mat 12 exit the forming section 58 under exit roller 66 and enter the curing oven 70. The uncured pack 64 and mat 12 are compressed between the upper curing oven chain 72 and the lower curing oven chain 74. Heated air is forced from fan 76 through the lower chain 72, the pack 64 and upper chain 74 to cure the binder in pack 64 and to adhere the mat 12 to the pack to form the mat faced fibrous insulation 10. The heated air passes out of the curing oven 70 through exhaust section 78.

The mat faced fibrous insulation 10 then exits curing oven and is rolled by the roll-up device 82 for storage and shipment. The mat faced fibrous insulation 10 may subsequently be cut or die pressed to form fibrous insulation parts.

Figure 5:
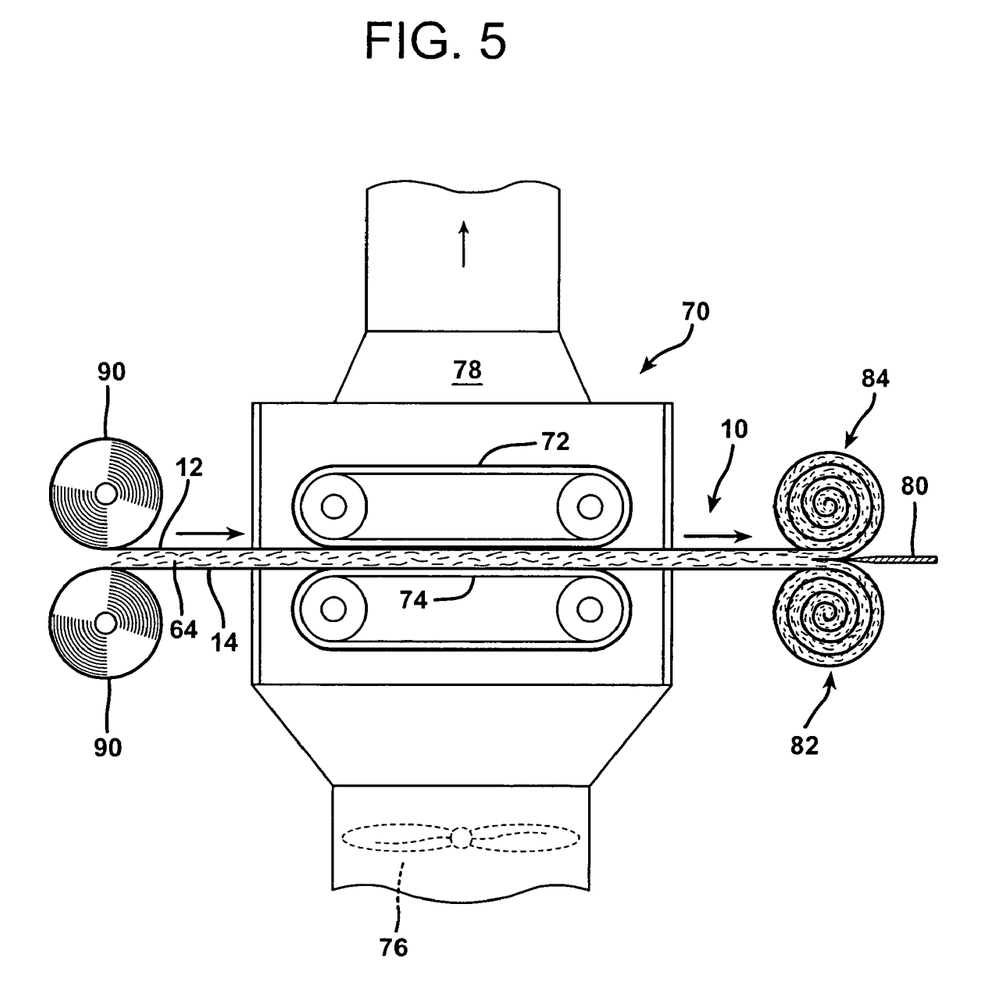
FIG. 5 is a detailed plan view of a manufacturing line for producing mat faced fibrous insulation wherein the mat facing is applied to the upper and lower surfaces of the uncured pack after the pack exits the glass fiber forming section and showing that the double mat faced fibrous insulation is bisected and rolled into two rolls after curing.

In a second embodiment depicted in FIG. 5, the uncured pack 64 exits the forming section and mat 12 is applied to one surface of uncured pack 64 from roll 90 and mat 14 is applied to another surface of uncured pack 64. The mat layers 12, 14 and the uncured pack 64 then enter the curing oven 70. The uncured pack 64 and mat layers 12, 14 are compressed between the upper curing oven chain 72 and the lower curing oven chain 74 and heated air is forced through the chains 72, 74 and the pack 64 to cure the binder in pack 64 and to adhere the mat layers 12, 14 to the pack to form the mat faced fibrous insulation 10.

As the mat faced fibrous insulation 10 exits curing oven, it is bisected by bisect saw 80 and rolled into two rolls by lower roll-up 82 and upper roll-up 84 for storage and shipment. It is also contemplated that the bisected material may be rolled on a single roll-up to form a double layer single roll. It is also contemplated that the mat faced fibrous insulation will not be bisected and will be supplied as a double faced insulation product as shown in FIG. 2. It is also contemplated that mat 14 may be supplied to the pack 64 in the forming section, as shown in FIG. 4. It is further contemplated that a double faced product may be supplied in panels as shown in FIG. 6.

Figure 6:
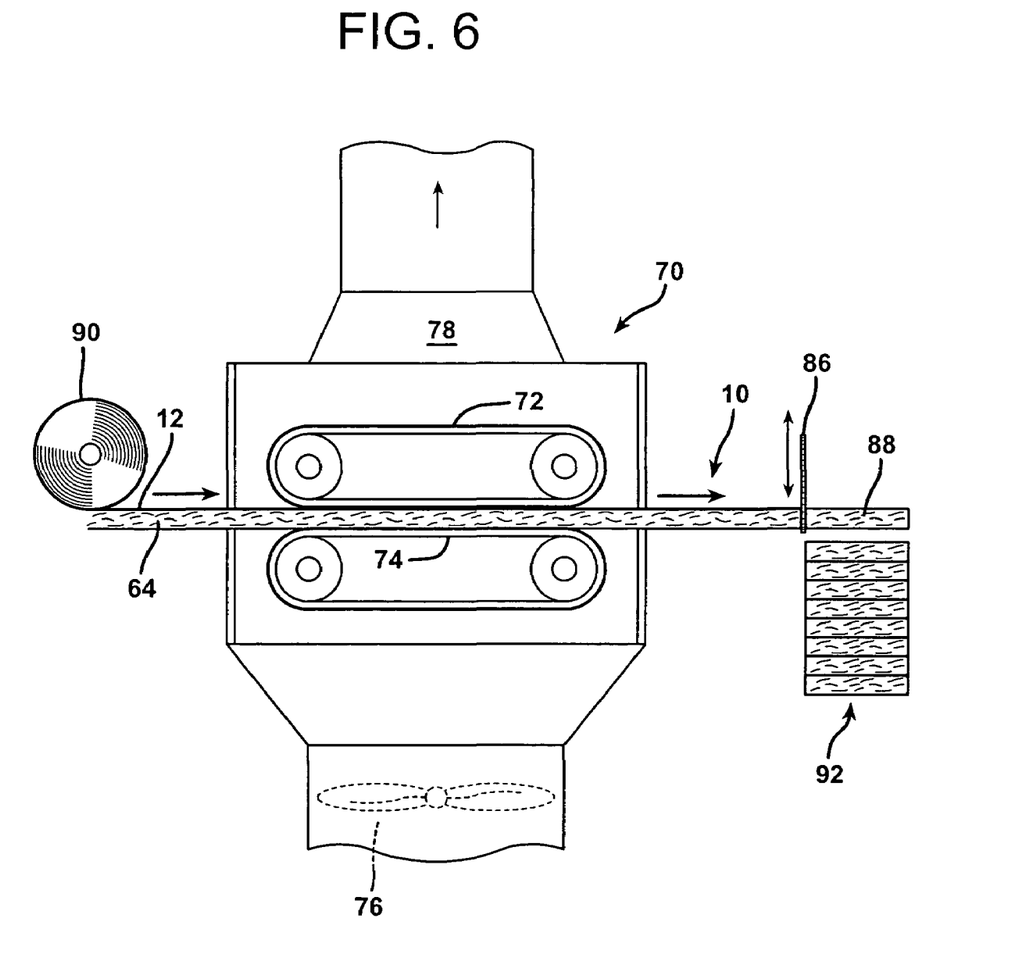
FIG. 6 is a detailed plan view of a manufacturing line for producing mat faced fibrous insulation wherein the mat facing is applied to the upper surface of the uncured pack after the pack exits the glass fiber forming section and showing that the mat faced fibrous insulation is cross cut to form panels which are stacked.

A further embodiment is shown in FIG. 6. It can be seen in FIG. 6 that once the uncured pack 64 exits the forming section, mat 12 is applied to one surface of uncured pack 64 from roll 90. The mat layer 12 and the uncured pack 64 then enter the curing oven 70. The uncured pack 64 and mat layer 12 are compressed between the upper curing oven chain 72 and the lower curing oven chain 74 and heated air is forced through the chains 72, 74 and the uncured pack 64 to cure the binder in pack 64 and to adhere the mat layer 12 to the pack to form the mat faced fibrous insulation 10.

The mat faced fibrous insulation 10 exits curing oven and is cut to length by blade 86 to form panels 88 of mat faced fibrous insulation which may then be stacked or bagged by packaging unit 92. It is also contemplated that panels 88 of mat faced fibrous insulation 10 will be supplied as a double faced product as shown in FIG. 2. It is further contemplated that mat 14 may be supplied to the pack 64 in the forming section, as shown in FIG. 4.

Figure 7A:
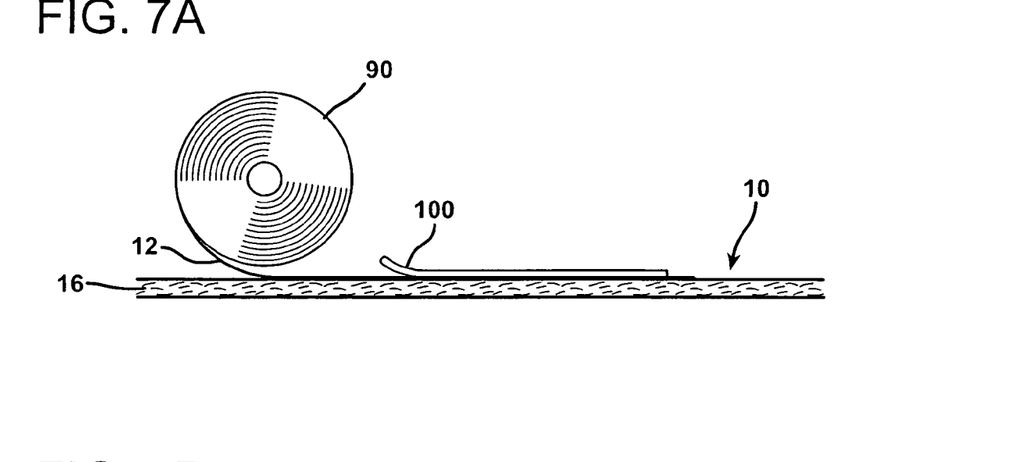
FIG. 7A is a plan view of an alternative method of forming the mat faced fibrous insulation in a post-curing oven or off-line process using a heated platen to adhere the mat facing to the fibrous insulation.

FIG. 7A shows an alternative method of forming the mat faced fibrous insulation 10 in a post-curing oven or off-line process using a heated platen 100 to adhere the mat facing 12 from roll 90 to the fibrous insulation 16.

Figure 7B:
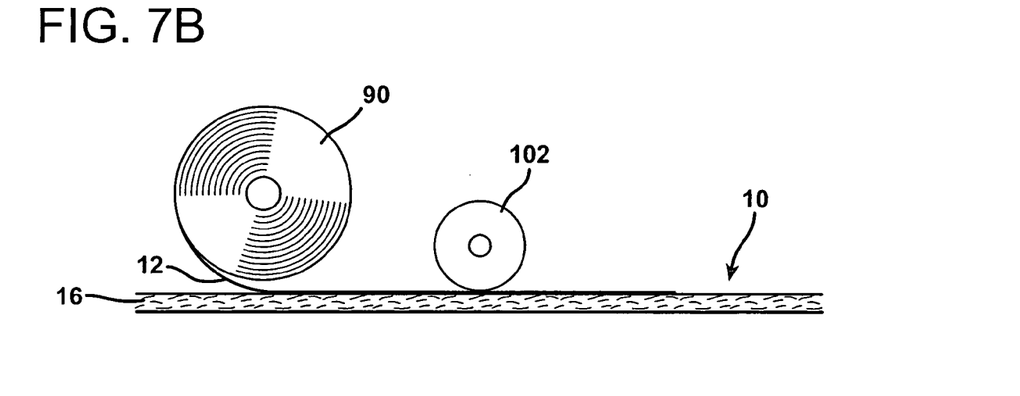
FIG. 7B is a plan view of an alternative method of forming the mat faced fibrous insulation in a post-curing oven or off-line process using a heated roll to adhere the mat facing to the fibrous insulation.

FIG. 7B is a plan view of an alternative method of forming the mat faced fibrous insulation 10 in a post-curing oven or off-line process using a heated roll 102 to adhere the mat facing 12 from roll 90 to the fibrous insulation 16.

Figure 7C:
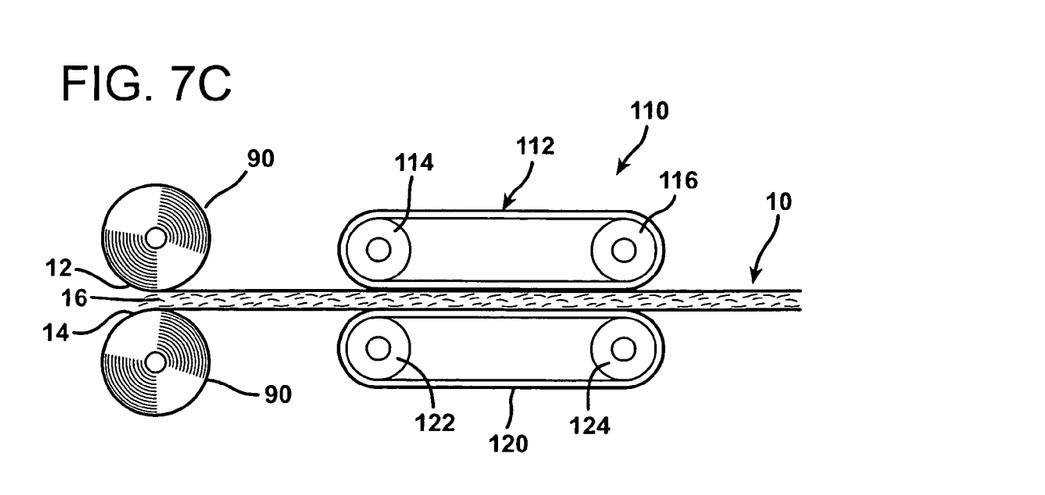
FIG. 7C is a plan view of an alternative method of forming the mat faced fibrous insulation in a post-curing oven or off-line process using a heated caterpillar to adhere the mat facing to the fibrous insulation.

FIG. 7C is a plan view of an alternative method of forming the mat faced fibrous insulation 10 in a post-curing oven or off-line process using a heated caterpillar 110 that has a heated upper belt 112, which rotates round first upper belt roller 114 and second upper belt roller 116 to compress fibrous insulation against heated lower belt 120, which rotates round first lower belt roller 122 and second lower belt roller 124 for a time sufficient to heat the adhesives 22, 24 to adhere the mat facing 12 to the fibrous insulation 16.

The mat faced fibrous insulation of the present invention includes at least one layer of fibrous insulation such as glass fibers, mineral wool, rock wool, or polymer fibers and at least one layer of a fibrous mat. One skilled in the art it will recognize that it is possible to manufacture a number of product configurations based on the teachings hereof, including a single layer of fibrous insulation with a single layer of mat applied to one surface, a single layer of fibrous insulation with mat applied to opposed major surfaces, a single layer of fibrous insulation with mat applied to opposed major surfaces wherein the at least one layer of the mat is wider than the major surfaces so that one or more minor surfaces of the fibrous insulation may be mat faced. It is also possible to apply multiple layers of fibrous insulation with mat facing there between with any one of the above mentioned mat facings applied thereto.

The invention of this application has been described above both generically and with regard to specific embodiments.

Although the invention has been set forth in what is believed to be the preferred embodiments, a wide variety of alternatives known to those of skill in the art can be selected within the generic disclosure. The invention is not otherwise limited, except for the recitation of the claims set forth below.

I claim:

1. A mat faced fiberglass insulation product, comprising:
   a fiberglass insulation layer including glass fibers having a diameter of between about 3 to about 9 microns and a binder content of between about 2 to about 15% having first and second opposed major surfaces; and
   a first mat facing adhered to a first major surface of the fiberglass insulation layer, the mat facing including a non-woven layer having a first powdered polyethylene adhesive with a first melting point and a second powdered polyamide adhesive with a second melting point, wherein the mat facing is adhered to the first major surface of the fiberglass insulation layer by heating the mat facing and the fiberglass insulation layer to a temperature above the melting point of said first adhesive for a time sufficient to adhere the mat facing to the fiberglass insulation layer.

2. The mat faced fibrous insulation product of claim 1, further comprising:
   a thermally activated binder applied to the fiberglass insulation layer, wherein said thermally activated binder is cured by the heat used to adhere the mat facing to the first major surface.

3. The mat faced fibrous insulation product of claim 1, further comprising:
   a second mat facing adhered to the second major surface of the fiberglass insulation.

4. The mat faced fibrous insulation product of claim 1, wherein the non-woven layer is formed of fibers selected from the group consisting of polyethylene, polypropylene, polyesters, rayon, nylon and blends thereof.

5. The mat faced fibrous insulation product of claim 4, wherein the non-woven layer is formed of a blend of polyester and rayon fibers.

* * * * *